United States Patent [19]

Gross

[11] Patent Number: 5,300,341

[45] Date of Patent: Apr. 5, 1994

[54] PORTABLE RINSE DECK

[76] Inventor: Terrance R. Gross, 408 S. Main, Timber Lake, S. Dak. 57656

[21] Appl. No.: 932,650

[22] Filed: Aug. 20, 1992

[51] Int. Cl.$^5$ ............................. B32B 3/06; B32B 3/10
[52] U.S. Cl. ......................................... 428/44; 428/52; 428/61; 428/119; 404/2
[58] Field of Search ............... 428/61, 44, 52, 119; 134/123; 404/2

[56] References Cited

U.S. PATENT DOCUMENTS

| | | | |
|---|---|---|---|
| 3,315,691 | 4/1967 | Widner | 134/57 |
| 3,378,018 | 4/1968 | Lawter | 134/109 |
| 3,689,318 | 9/1972 | Phillips | 134/23 |
| 4,246,982 | 1/1981 | Pretnick | 184/106 |
| 4,300,721 | 11/1981 | Rich | 238/2 |
| 4,867,798 | 9/1989 | Weikmann | 134/6 |
| 4,917,125 | 4/1990 | Midkiff | 134/123 |

Primary Examiner—Alexander S. Thomas
Attorney, Agent, or Firm—Zarley, McKee, Thomte, Voorhees & Sease

[57] ABSTRACT

A portable rinse deck for farm chemical sprayers includes a center sump pit connected to radially extending sections sloped toward the sump pit for collecting spray chemicals washed from spray equipment on tractors, airplanes or helicopters. The radial sections include inner, middle and outer panels arranged to form right and left half sections. A radially extending channel receives the side flanges of adjacent panels with the radial channels feeding any chemicals leaking through the platform to the sump pit. A hub assembly is positioned over the sump pit and includes support channels which receive the inner ends of the radial channels for feeding the sump pit.

20 Claims, 6 Drawing Sheets

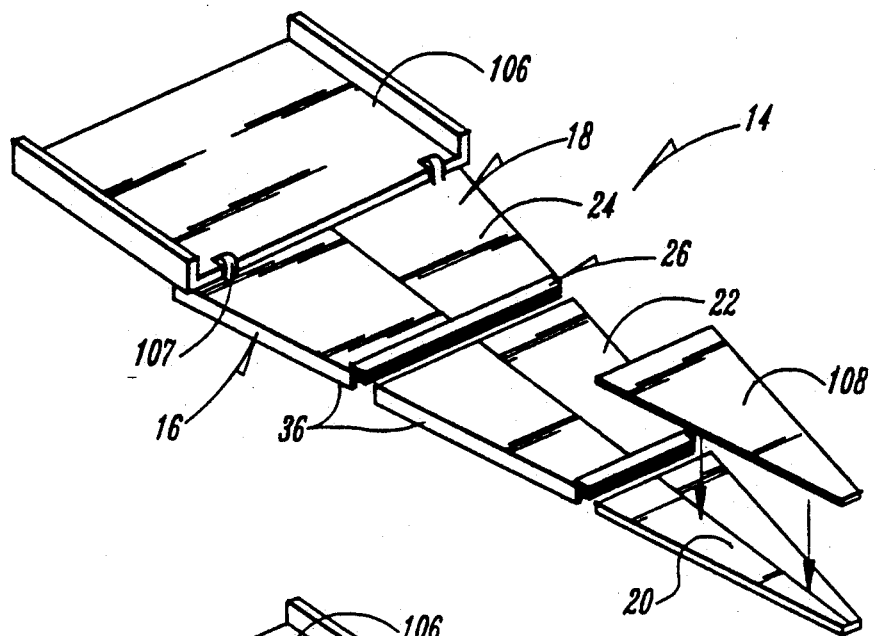
FIG. 5
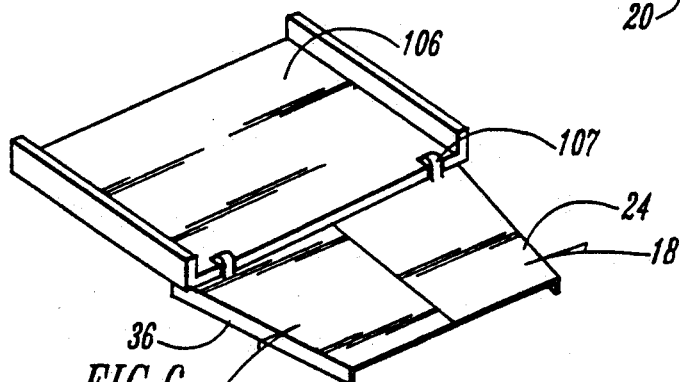
FIG. 6
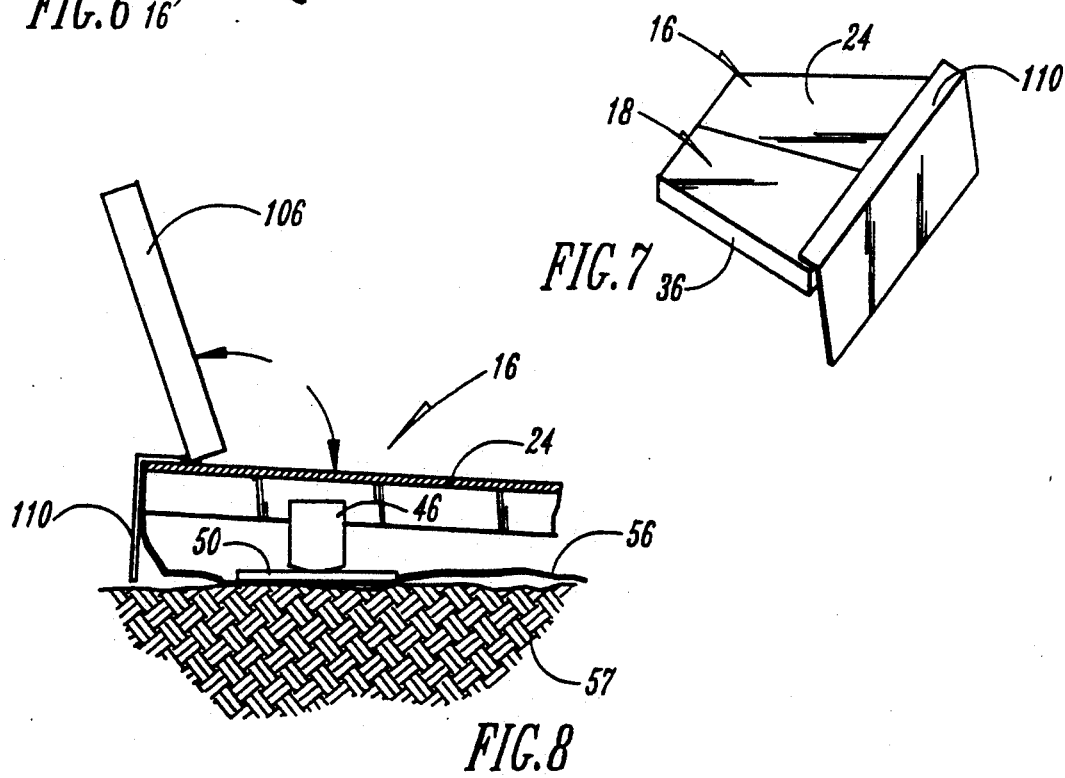
FIG. 7
FIG. 8

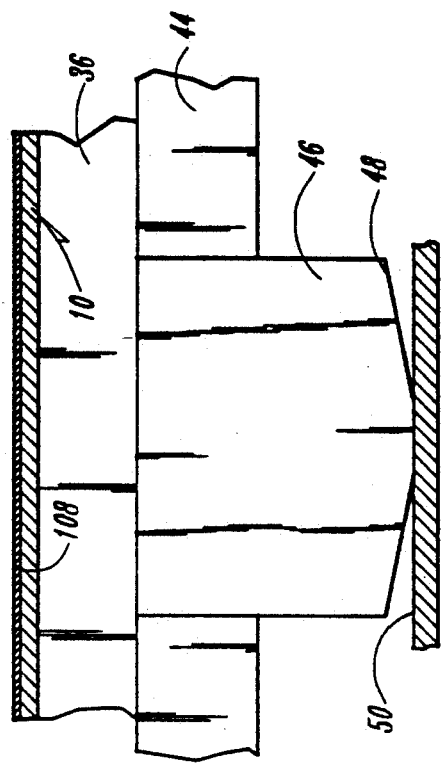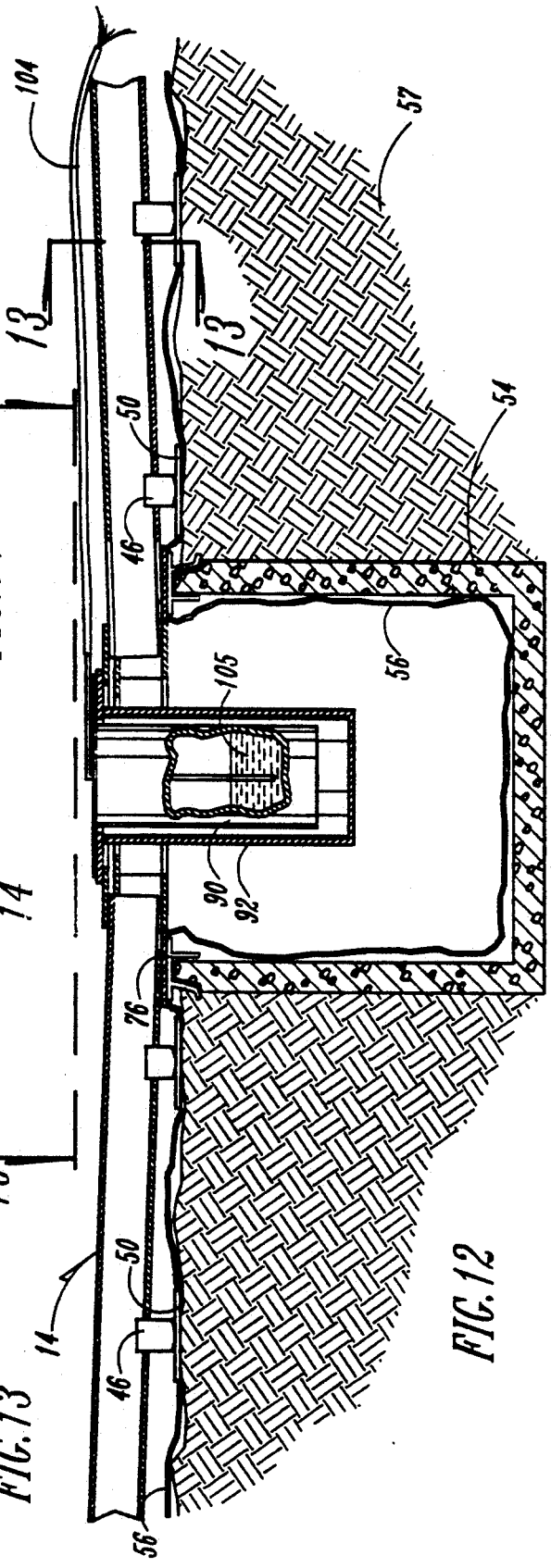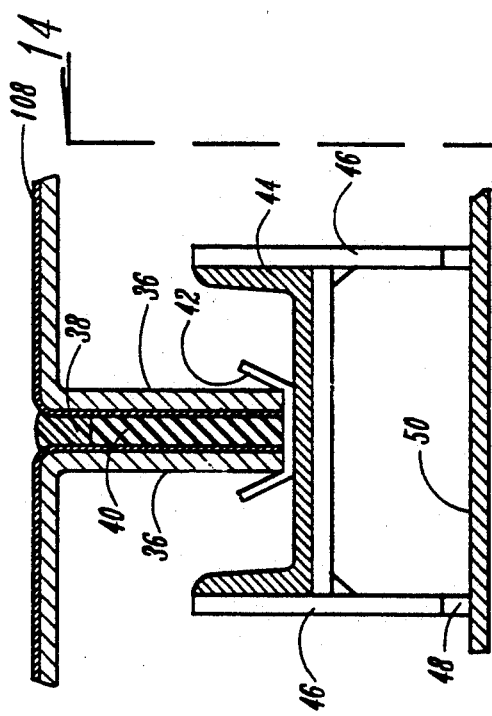

PORTABLE RINSE DECK

BACKGROUND OF THE INVENTION

The chemicals removed from farm spray equipment during cleaning cannot be allowed to collect on the ground but must be recycled or disposed of in an environmentally acceptable manner. The spray equipment may have been powered by a tractor, airplane or helicopter. Thus, what is needed is a system that will allow the equipment to be readily cleaned in a manner environmentally consistent with the environment.

SUMMARY OF THE INVENTION

This invention involves a portable rinse deck which may be readily assembled or disassembled for moving to a new location. Backup systems are provided to prevent any chemicals inadvertently being returned to the earth.

The portable deck includes a centrally located sump pit with radiating interconnected deck sections extending therefrom forming a platform which slopes to the center sump pit. There are preferably eight sections which form an octagonal deck structure. Each of the eight sections are divided into right and left half sections and each half section is further divided into inner, middle and outer panels.

The inner panel has a radius or length of ten feet, the middle and outer panels have radial measurements of six feet each.

Each of the panels have radially extending downwardly facing side flanges which are received in radially extending upwardly facing channels which are supported on spaced apart drop shoes. The drop shoes have convex feet which allow them to rock as required to level the deck structure. The drop shoes are placed on steel ground plates. A polyurethane seal and synthetic fabric filler are provided between adjacent panel sidewalls and a clamping wedge means receives the lower edges of the sidewalls to maintain a seal therebetween.

A central hub assembly is provided over a concrete sump pit which is lined with a plastic ten mil safety liner which also extends under the entire platform as backup protection against leakage through the deck. The radially extending channels serve to drain any liquid flowing between the panels into the inner most of a pair of nesting canisters supported in the hub assembly. The hub assembly is an integral structure which has a bottom hub flange supporting a plurality of upperly facing support channels. A top hub flange completes the hub assembly. The support channels receive the inner ends of the radially extending channels and provide an extension for draining any liquid into the sump pit received by the support channels from the radially extending channels.

BRIEF DESCRIPTION OF THE DRAWINGS

FIG. 5 is a top perspective view of a deck section with a deck wing extension and cover plate.

FIG. 6 is an enlarged perspective view of the outer right and left panels pivotally connected to the deck wing extension.

FIG. 7 is a fragmentary perspective view of a portion of the deck showing the skirt apron.

FIG. 8 is an enlarged cross sectional view of the deck showing the deck wing extension being pivoted between an inwardly extending position to an outwardly extending position.

FIG. 12 is a cross sectional view taken along line 16—16 of the assembled deck.

FIG. 13 is a cross sectional view taken along line 13—13 in FIG. 12 showing the radially extending channel supporting the panel sidewalls.

FIG. 14 is a cross sectional view taken along line 14—14 in FIG. 13 showing the drop shoe supporting the radial channels.

DESCRIPTION OF PREFERRED EMBODIMENT

Figure 1:
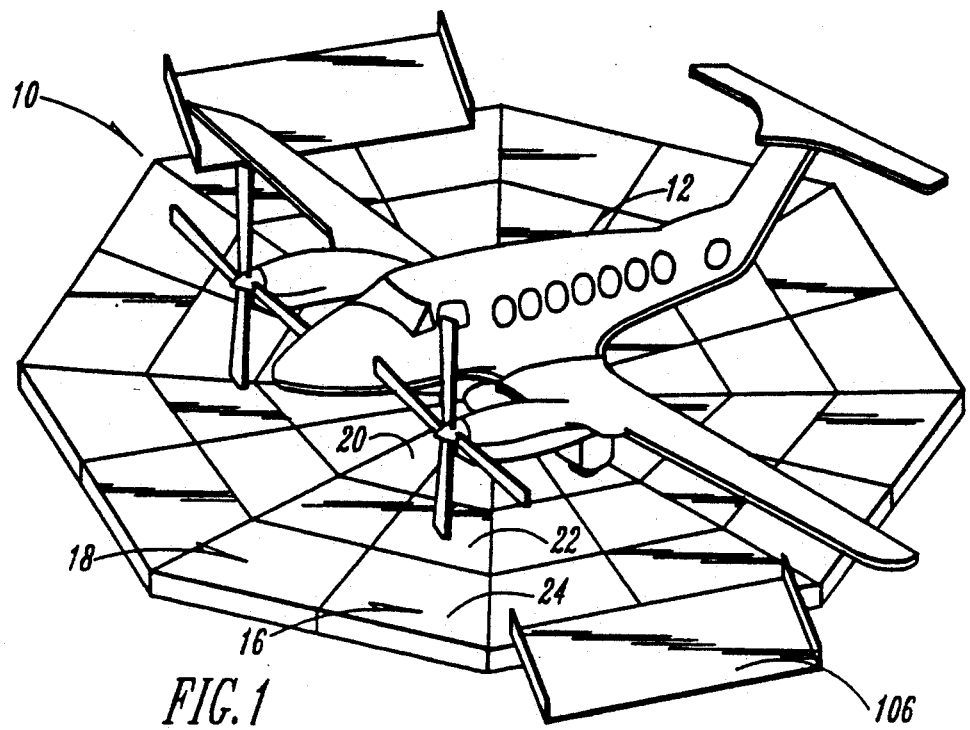
FIG. 1 is a top perspective view of the portable rinse deck showing an airplane parked for cleaning the spray apparatus (not shown).
Figure 2:
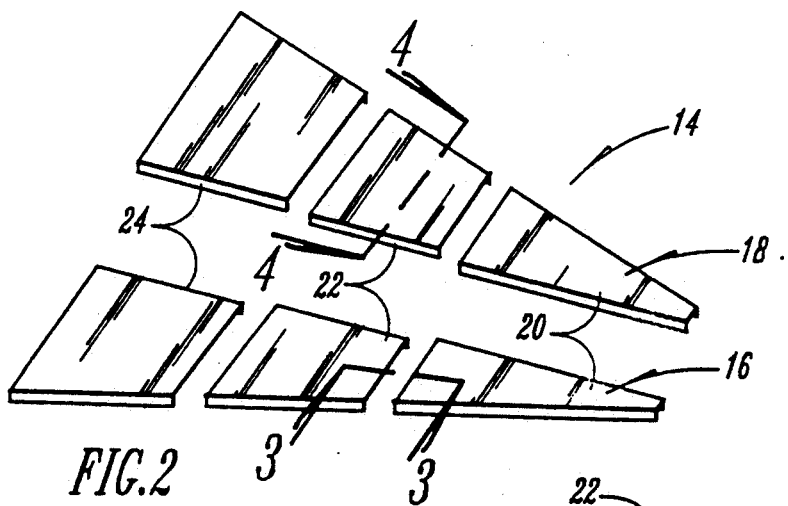
FIG. 2 is a perspective view of one section which includes a right and left half section divided into inner, middle and outer panels.

The portable rinse deck of this invention is referred to generally in FIG. 1 by the reference numeral 10 and is shown being used to wash down the farm chemical spray equipment (not shown) on an airplane 12.

The deck 10 includes eight radially extending sections 14 which in turn are formed by left and right half sections 16 and 18 respectively. Each of the half sections are further defined by inner, middle and outer panels 20, 22 and 24, respectively. Each of the outer panels 24 have straight edges thereby giving the deck an octagonal shape.

Figure 3:
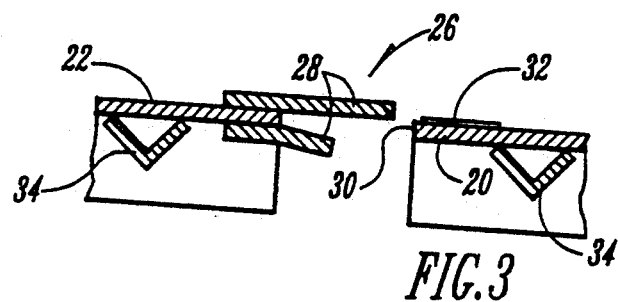
FIG. 3 is a cross sectional view taken along line 3—3 in FIG. 2 showing the connection between connected panels.

The inner, middle and outer panels are interconnected by a tongue and groove connection 26 as seen in FIG. 3 which includes a pair of plates 28 on the inner edge of the middle panel 22 which receive the top plate of the inner panel 20 which functions as a tongue 30. A gasket seal 32 is provided on the tongue 30 to seal the connection 26. Strengthening channels 34 are provided on the bottom side of each of the panels as seen in FIG. 3.

Figure 4:
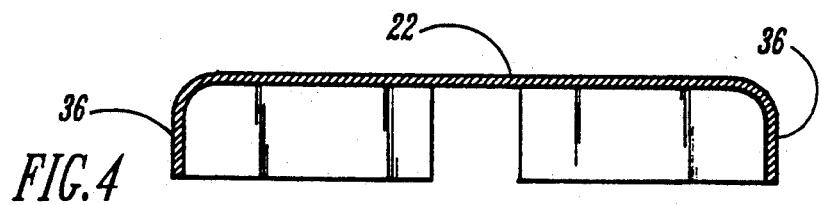
FIG. 4 is a cross sectional view taken along line 4—4 in FIG. 2.
Figure 9:
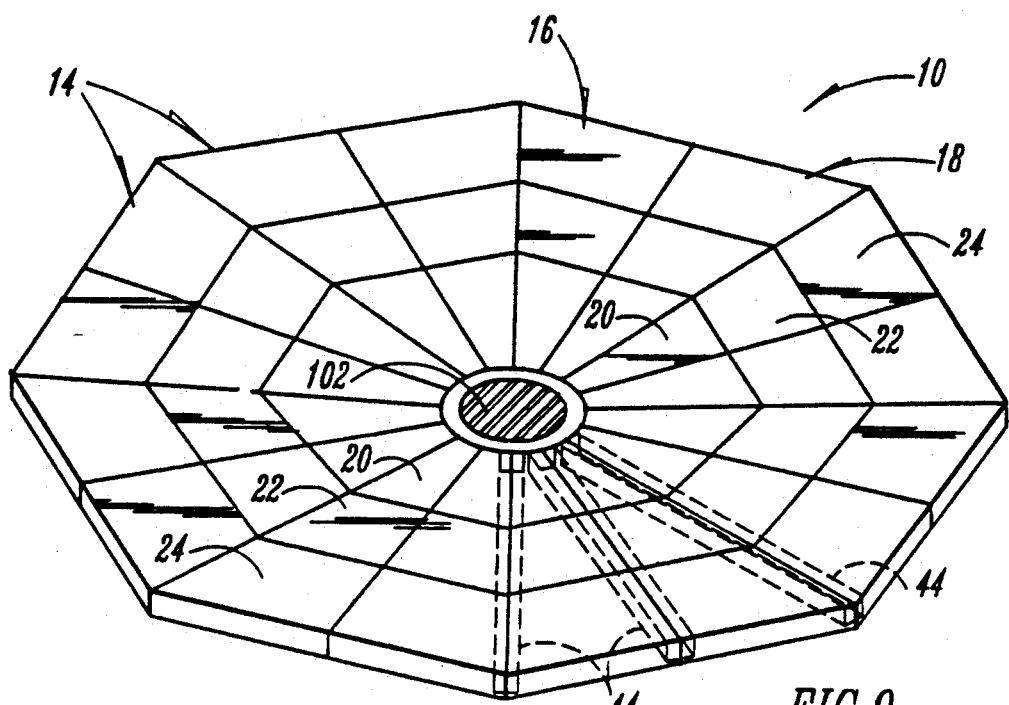
FIG. 9 is a top perspective view of the portable deck.

Each of the panels 20, 22 and 24 have downwardly extending outer radial sidewalls 36 as seen in FIG. 4 and are provided with a polyurethane seal 38 therebetween provided over a synthetic fabric filler 40 as seen in FIG. 13. The lower edges of the sidewalls 36 are clamped together by an upwardly facing wedge 42 positioned in the center of a radial channel 44 extending the radial length of the individual half sections 16 and 18.

Support is provided for the radial channels 44 by spaced apart drop shoes 46 which have convex downwardly extending feet 48 engaging ground plates 50 as seen in FIG. 14. The drop shoes allow the channels 44 to be aligned and leveled. The drop shoes are progressively taller moving from the sump pit 54 outwardly to the outer peripheral edge of the deck as best seen in FIG. 12. These progressively taller drop shoes 46 assure the desired slope for the deck which will cause the liquids on the deck to flow into the sump pit 54.

Figure 10:
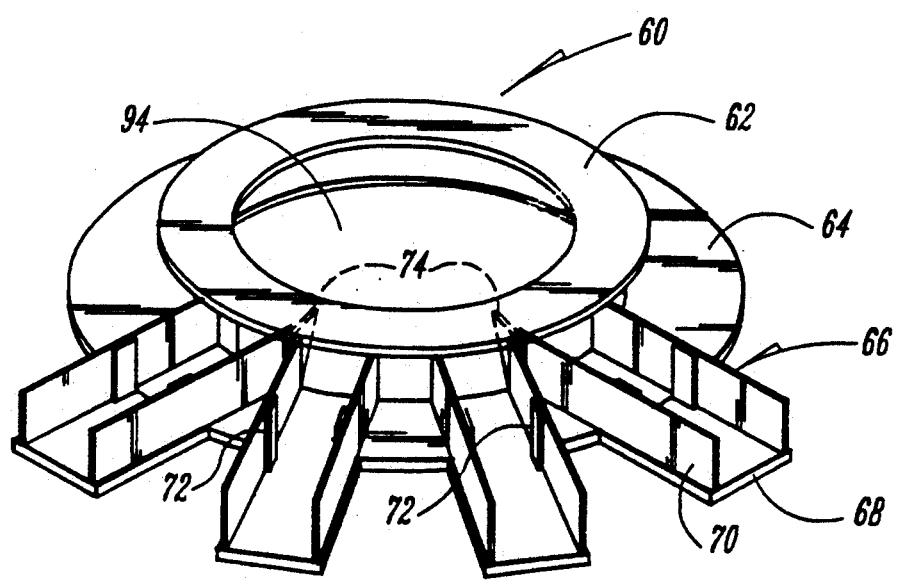
FIG. 10 is a top perspective view of the hub assembly.
Figure 11:
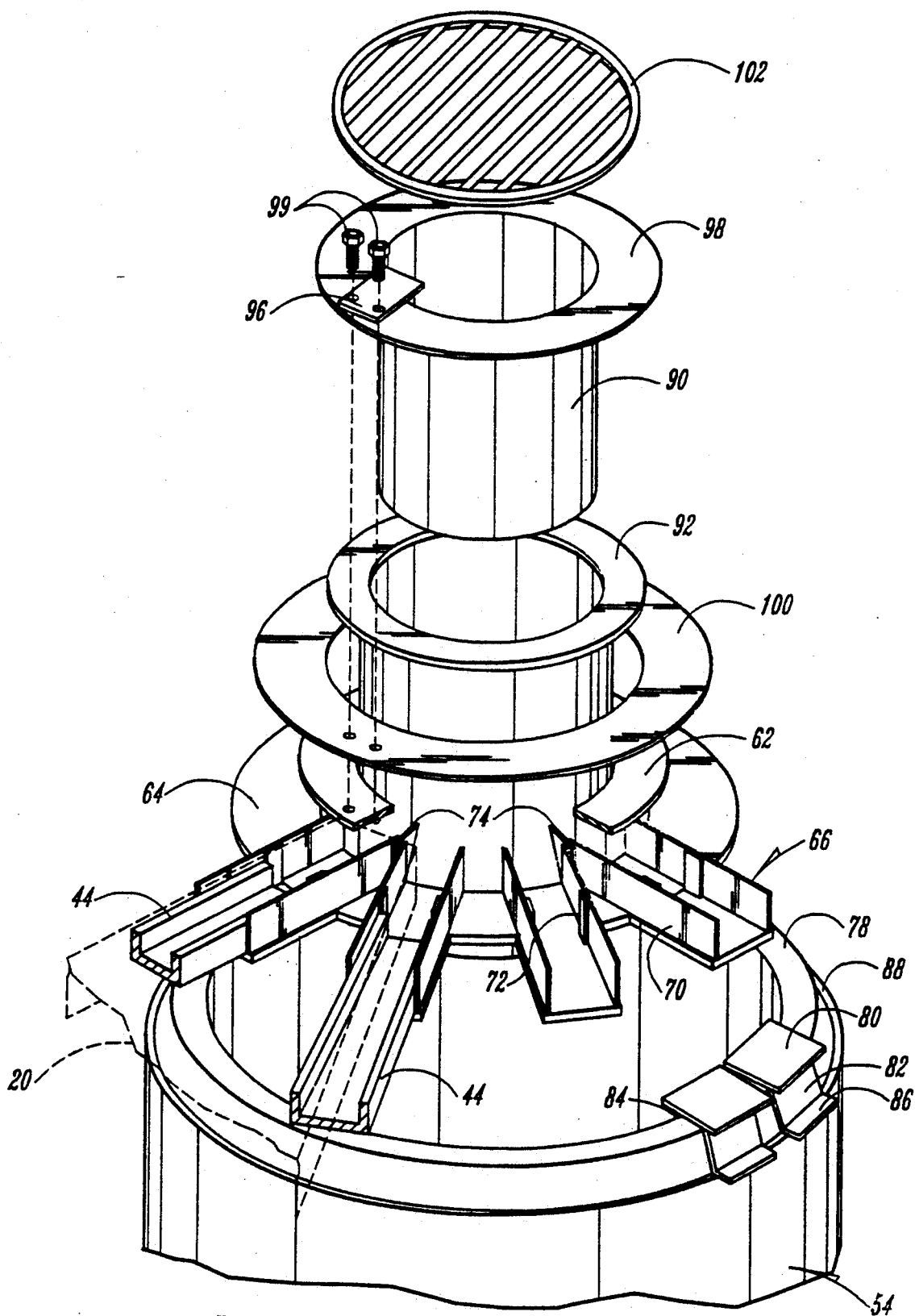
FIG. 11 is a fragmentary exploded perspective view of the sump pit on which the hub assembly is positioned.
Figure 15:
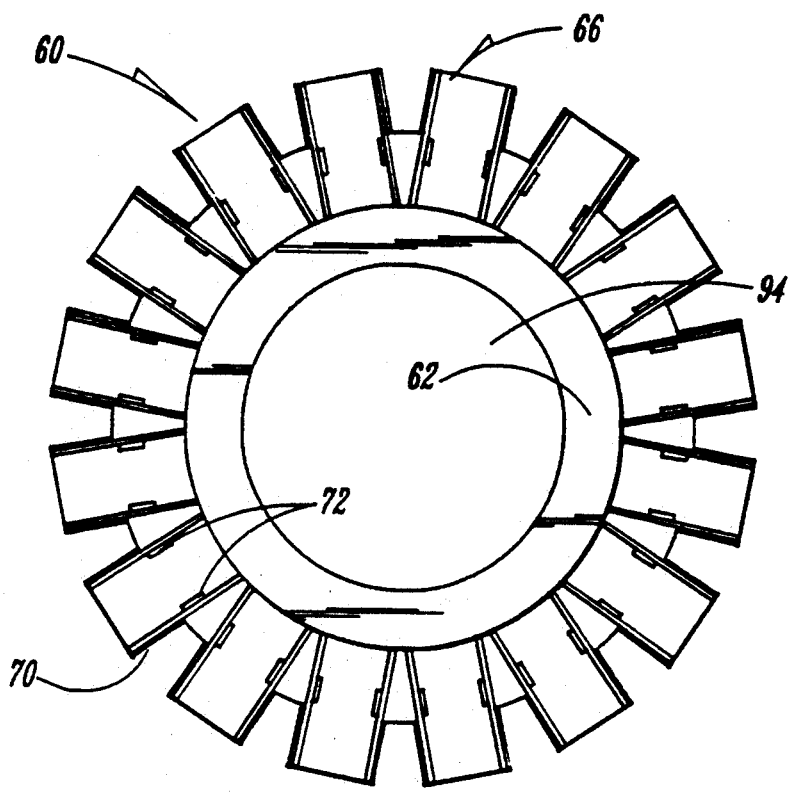
FIG. 15 is a top plan view of the hub assembly.
Figure 16:
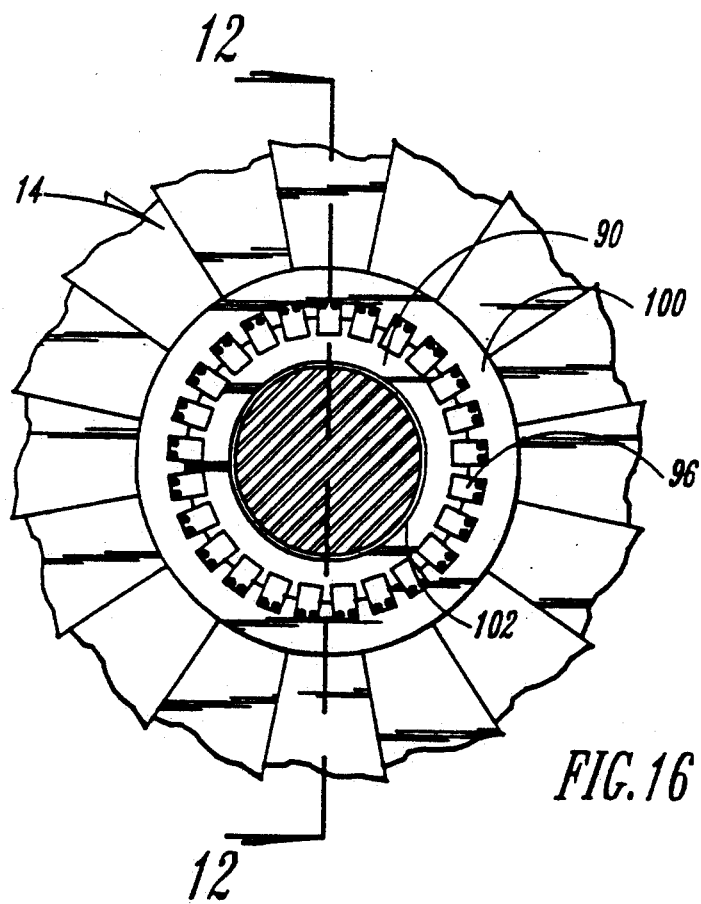
FIG. 16 is a fragmentary enlarged top plan view of the assembled portable rinse deck.

The sump pit 54 includes a plastic ten mil safety liner 56 which extends outwardly under the deck 10 as seen in FIG. 12. The sump pit 54 is formed from concrete and is placed in the ground 57 with the top open end at ground level. A hub assembly 60 is centered over the sump pit 54 and includes top and bottom hub flanges 62 and 64 which integrally lock together upwardly facing support channels 66 as seen in FIG. 10. The support channels 66 have bottom walls 68 and opposite sidewalls 70. Vertically disposed stop plates 72 are provided on the inside faces of the sidewalls 70 to position the radial channels 44 received therein as seen in FIG. 11. Gusset plates 74 are welded between the sidewalls 70 and the top and bottom hub flanges 62 and 64. The bottom walls 68 of the support channel 66 are supported on saddles 76 mounted on the top rim 78 of the sump pit 54 as seen in FIG. 11. The saddles 76 have top plates 80 and downwardly extending opposite legs 82 and 84. The leg 82 has an outwardly extending flange 87 seated on an annular shoulder 88 of the sump pit 54.

Positioning of the hub assembly 60 onto the sump pit 54 is seen in FIG. 11 and includes a pair of inner and outer canisters 90 and 92 which are in nesting relationship received in the center opening 94 of the hub assembly 60. Hold down clips 96 are connected to a flange 98 of the inner bolts 99 which extend down through a finishing flange 100 and thence into the top hub flange 62. A grate 102 is placed on the inner canister 90 over the flange 98.

As seen in FIG. 12, a drain hose 104 extends down into the liquid 105 in the inner canister 90. This hose may be connected to any suitable pump for emptying the sump pit 54.

As seen in FIGS. 1, 5, 6 and 8, a deck extension 106 is pivotally connected to two of the outer radial sections 14 by hinges 107. The extensions 106 may be pivoted to inwardly extending positions overlying the outer panels 24 or extend outwardly under the wing tips of the airplane 12. It is also seen that a cover plate 108 may be provided optionally over the entire deck 10 as seen in FIG. 5. A skirt apron 110 extends around the outer peripheral edge of the entire deck 10 as seen in FIGS. 7 and 8.

It is thus seen that the portable rinse deck 10 may be readily assembled and disassembled and includes a failsafe system for preventing any chemicals reaching the ground. Most chemicals will run off the deck 10 into the sump pit 54 but should any pass between the adjacent sidewalls 36 of panels 20, 22 and 24, the radial channels 44 will route the liquids into the center hub assembly 60 and in turn into the sump pit 54 containing the inner and outer canisters 90 and 92.

What is claimed is:

1. A portable rinse deck comprising,
a plurality of interconnected deck sections radiating outwardly of a centrally positioned sump pit, said deck sections being sloped inwardly towards said sump pit to drain liquid on the deck into the sump pit, and
seal means between adjacent sections to prevent liquid leakage therebetween.

2. The structure of claim 1 wherein said deck sections include radially downwardly extending longitudinal side flanges and said seal means is positioned between adjacent deck section side flanges.

3. The structure of claim 2 wherein an upwardly facing elongated radially extending channel member is positioned under each pair of adjacent deck section side flanges for supporting said deck sections.

4. The structure of claim 3 wherein a plurality of spaced apart drop shoes are positioned under each channel member to support and level said deck sections.

5. The structure of claim 4 wherein said drop shoes have downwardly facing convex feet engaging a support surface for self leveling of said deck sections.

6. The structure of claim 5 wherein clamping means are provided in each channel member to engage each pair of adjacent deck section side flanges to hold said side flanges tightly together.

7. The structure of claim 5 wherein said support surface includes metal plates provided on the ground and under said convex feet.

8. The structure of claim 1 wherein each deck section includes an outer peripheral straight edge thereby forming a multisided deck.

9. The structure of claim 8 wherein each deck section includes right and left interconnected panels, and each of said panels includes downwardly facing radially extending side flanges.

10. The structure of claim 9 wherein said adjacent right and left panel side flanges intersect the outer peripheral straight edge forming a right angle therewith.

11. The structure of claim 10 wherein each of said right and left panels include inner and outer interconnected panels.

12. The structure of claim 11 wherein said inner and outer panels include a middle panel interconnected therewith.

13. The structure of claim 1 wherein each deck section includes radially interconnected inner and outer deck panels.

14. The structure of claim 13 wherein said inner and outer deck panels further include a middle panel.

15. The structure of claim 13 wherein said inner and outer deck panels are interconnected by adjacent edges of each having tongue and groove connecting means.

16. The structure of claim 1 wherein said rinse deck includes a hub assembly positioned over said sump pit, said hub assembly including a plurality of radially extending support channels receiving inner ends of said deck sections.

17. The structure of claim 16 wherein said support channels at their inner ends are rigidly connected between top and bottom circular concentric flanges.

18. The structure of claim 17 wherein each of said deck sections include downwardly extending radial side flanges and inner ends of radial side flanges of adjacent deck sections are received in said support channels.

19. The structure of claim 18 wherein said sump pit includes a concrete upstanding exterior wall positioned in the ground and having a top rim supporting said support channels.

20. The structure of claim 19 wherein said circular top and bottom flanges of said hub assembly include an axial opening over said sump pit, and a canister is received in said axial opening and extends down into said sump pit for receiving liquid from said deck.

* * * * *